United States Patent
McCune et al.

(10) Patent No.: US 6,567,491 B1
(45) Date of Patent: May 20, 2003

(54) HIGH EFFICIENCY LINE DRIVER FOR HIGH CREST-FACTOR SIGNALS SUCH AS DMT/ADSL SIGNALS

(75) Inventors: Earl W. McCune, Santa Clara, CA (US); Wendell Sander, Los Gatos, CA (US)

(73) Assignee: Tropian, Inc., Cupertino, CA (US)

( * ) Notice: Subject to any disclaimer, the term of this patent is extended or adjusted under 35 U.S.C. 154(b) by 0 days.

(21) Appl. No.: 09/419,707

(22) Filed: Oct. 14, 1999

(51) Int. Cl.⁷ .......................... H04B 14/06; H04B 3/00; H04L 27/04; H04L 27/06
(52) U.S. Cl. ...................... 375/547; 375/258; 375/295; 375/316
(58) Field of Search ................................ 375/257, 258, 375/247, 242, 222, 260, 295, 286, 316; 341/56, 77

(56) References Cited

U.S. PATENT DOCUMENTS

| | | | | |
|---|---|---|---|---|
| 3,991,611 A | * | 11/1976 | Marshall, III et al. | 73/151 |
| 5,353,309 A | * | 10/1994 | Agazzi et al. | 375/285 |
| 5,465,270 A | * | 11/1995 | Beauducel et al. | 375/242 |
| 5,654,984 A | * | 8/1997 | Hershbarger et al. | 375/257 |
| 6,055,268 A | * | 4/2000 | Timm et al. | 375/223 |
| 6,320,903 B1 | * | 11/2001 | Isaksson et al. | 375/260 |

* cited by examiner

Primary Examiner—Tesfaldet Bocure
(74) Attorney, Agent, or Firm—Thelen Reid & Priest LLP

(57) ABSTRACT

The present invention, generally speaking, achieves a highly efficient line driver for high crest-factor signals such as DMT/ADSL signals. In an exemplary embodiment, a digital signal produced by a digital signal processor or the like is processed by a sigma-delta modulator to produce one or more binary signal pairs. The signals of a signal pair are low-pass filtered, if necessary, and applied across the winding of a transformer. The transformer has a single secondary winding connected to the line and may has as many primary windings as the number of signal pairs. The transformer may have a unity turns ratio or may have a turns ratio for accomplishing voltage step-up. For one signal pair, the number of possible resulting signals levels on the secondary side is three, for two signal pairs five, etc. Using more than two signal levels, it becomes possible to recreate from the digital signals the corresponding analog waveform with the required accuracy. The circuit requires only a single supply voltage, is inherently balanced and provides high-voltage DC isolation.

10 Claims, 6 Drawing Sheets

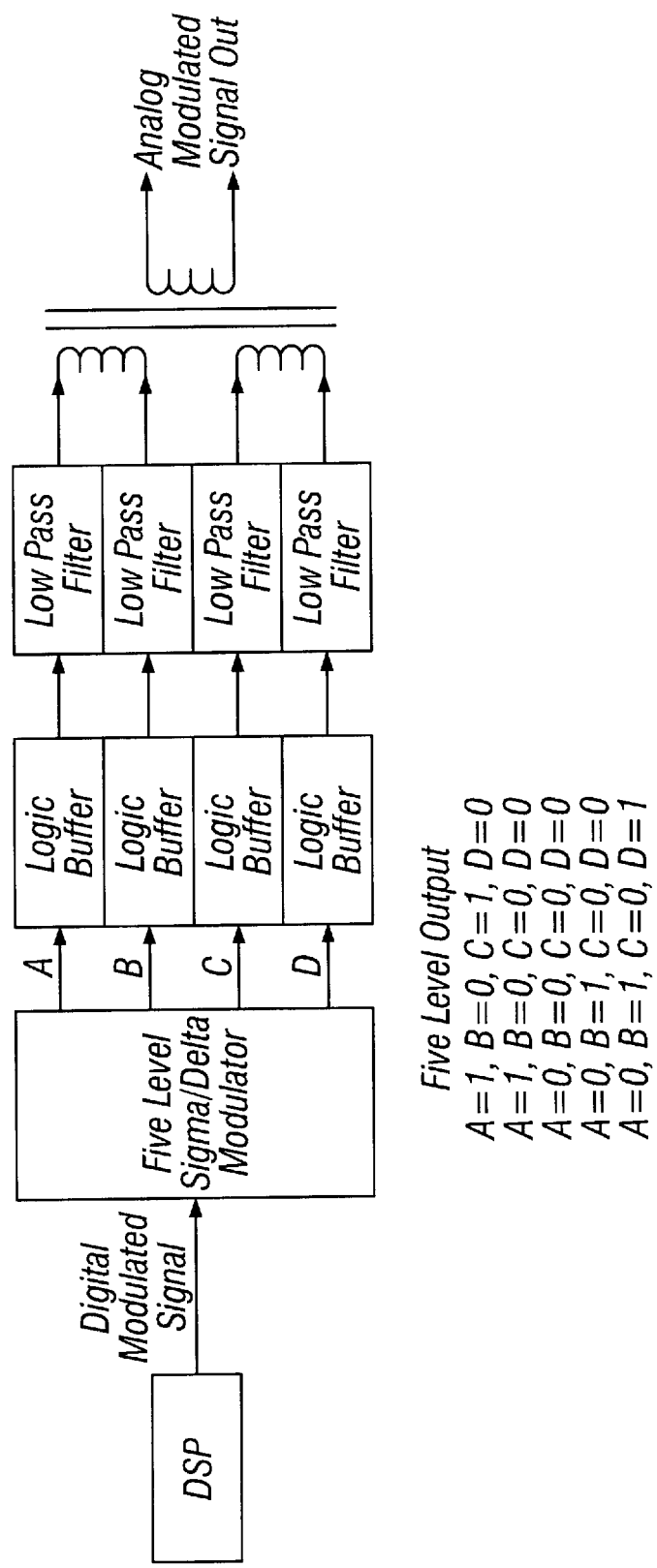

HIGH EFFICIENCY LINE DRIVER FOR HIGH CREST-FACTOR SIGNALS SUCH AS DMT/ADSL SIGNALS

BACKGROUND OF THE INVENTION

1. Field of the Invention

The present invention relates to line drivers for high-speed digital communications.

2. State of the Art

Broadband communications solutions, such as ADSL (Asynchronous Digital Subscriber Line) are increasingly in demand. The ability to achieve high data rates (e.g., 1 Mbps and above) between customer premises and the telephone system central office over existing (unconditioned) telephone lines poses a considerable technical challenge. ADSL is simply one example of a class of communications techniques generally known as Discrete Multitone (DMT). In DMT, a broad band of spectrum is divided into potentially a large number of sub-bands having a particular center frequency (tone). Conceptually, a digital communications signal is sent within each sub-band, all of the sub-band signals being added together to form a single complex signal. Referring to FIG. 1, in the specific case of ADSL, about 250 discrete tones are placed within a band from about 0.1 to 1.2 MHz (above the voice band, or POTS region), with information being modulated on each tone. Using such an arrangement, a combined bandwidth of up to 8 Mbps can be achieved.

An ADSL signal presents special problems for circuit designers because of its large "crest factor," defined as the ratio of the peak signal voltage to the average signal voltage. For ADSL, the crest factor is typically about 5.6. This high crest factor is accounted for by noting that, whereas the discrete multitone signals comprising an ADSL signal usually sum together to a relatively low average value, occasionally, the signals align in such as way as to sum together to a relatively high peak value. A typical ADSL signal might appear as shown in FIG. 2, for example, characterized by a high peak value, Vpk, and a low average value, Vave. The signal is produced by a digital signal processor (DSP) in the form of a digital signal having a sample rate in the range of about 3 to 5 MHz. (Also identified in FIG. 2 are voltage levels $Vs_1$ and $Vs_2$, referenced in the description that follows.)

FIG. 3 shows a first example of a prior-art ADSL line driver circuit. An 8 Mbps information stream is input to a DSP, which produces a complex modulated signal in the form of samples (e.g., 12 bit) at the aforementioned sample rate. The samples are converted to analog and the resulting signal low-pass filtered to produce a transmission signal. The transmission signal is applied to a linear (e.g., Class A) radio amplifier. Typically, the amplifier operates from ±15 V power supplies and receives about 10 W of power. About 9.9 W of power are dissipated within the amplifier, while about 0.1 W of power is output through an isolation transformer to the phone line.

Because of the power consumption and heat dissipation of the circuit of FIG. 3, only a few hundred such line drivers can be accomodated within a typical central office of the telephone system. That is, only a very small percentage of the subscriber's serviced by the central office can be provided with broadband service without rebuilding or reconfiguring the central office, which besides being very expensive is often not feasible.

FIG. 4 shows an improved prior-art ADSL line driver circuit. This circuit differs from that of FIG. 3 in that a "Class G" amplifier is used, comprising the usual Class A amplifier in combination with a switchable power supply. During normal operation, a supply voltage select circuit is set to apply a lower supply voltage $Vs_2$, say±5 V, to the amlifier. When greater signal range is required, the DSP produces a control signal PK that sets the supply voltage select circuit is set to apply a higher supply voltage $Vs_1$ (e.g.,±5 V) to the amlifier. The Class G amplifier dissipates about 3 W, as compared to almost 10 W in the original approach.

While the circuit of FIG. 4 provides a substantial improvement over the circuit of FIG. 3, the underlying problems of excessive power consumption, excessive heat dissipation, and low efficiency remain to a large degree.

Because of the linearity requirements of DMT/ADSL signals, circuits used heretofore for DMT/ADSL line drivers have been linear circuits. Other existing non-linear, switch-mode circuits have generally not been considered for this purpose. One such circuit is the sigma-delta modulator. Sigma-delta modulators are widely used for data conversion. A sigma-delta converter modulates a varying-amplitude analog input signal into a simple digital code at a frequency much higher than the Nyquist rate.

Another non-linear prior-art circuit is the Class D amplifier, most commonly used for audio applications. In a Class D amplifier, an input signal (typically an audio signal) is transformed into an output signal capable of being reproduced into the original signal on an external load, usually a speaker. In the basic operation of a Class D amplifier, an incoming signal is converted by a pulse-width modulator into a high-frequency rectangular wave, the average value of which tracks the original signal. The rectangular wave is fed into an output stage which provides level shifting and splits the signal into a driving signal high/low driving signals. The driving signals are filtered to remove switching noise, providing an averaged output to drive a load such as a speaker. Within the output stage, however, the high/low signals result in significant distortion due to imperfectly matched components. More particularly, pulses produced by pull-up and pull-down transistors, respectively, exhibit substantially different shapes. Such distortion is unacceptable in applications such as ADSL.

There remains a need for a line driver circuit for high crest-factor signals such as DMT/ADSL signals that consumes less power, dissipates less heat and is more efficient.

SUMMARY OF THE INVENTION

The present invention, generally speaking, achieves a highly efficient line driver for high crest-factor signals such as DMT/ADSL signals. In an exemplary embodiment, a digital signal produced by a digital signal processor or the like is processed by a sigma-delta modulator to produce one or more binary signal pairs. The signals of a signal pair are low-pass filtered, if necessary, and applied across the winding of a transformer. The transformer has a single secondary winding connected to the line and may has as many primary windings as the number of signal pairs. The transformer may have a unity turns ratio or may have a turns ratio for accomplishing voltage step-up. For one signal pair, the number of possible resulting signals levels on the secondary side is three, for two signal pairs five, etc. Using more than two signal levels, it becomes possible to recreate from the digital signals the corresponding analog waveform with the required accuracy. The circuit requires only a single supply voltage, is inherently balanced and provides high-voltage DC isolation.

BRIEF DESCRIPTION OF THE DRAWING

The present invention may be further understood from the following description in conjunction with the appended drawing. In the drawing:

FIG. 6 is a circuit diagram of another embodiment of an ADSL driver in accordance with the present invention;

DETAILED DESCRIPTION OF THE PREFERRED EMBODIMENTS

Figure 5:
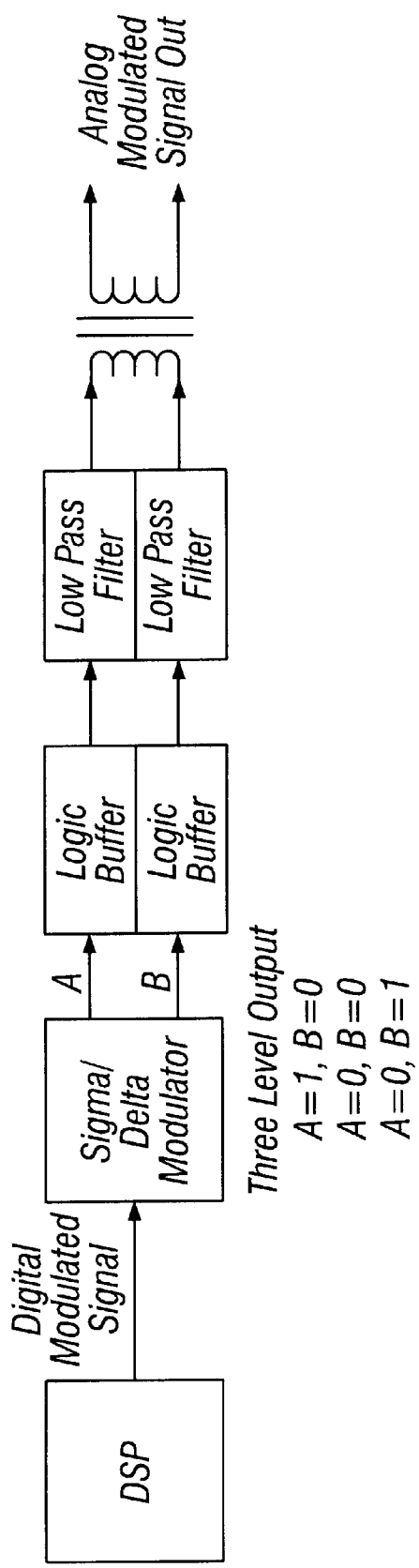
FIG. 5 is circuit diagram of one embodiment of an ADSL driver in accordance with present invention.

Referring now to FIG. 5, a block diagram is shown of a line driver circuit in accordance with an exemplary embodiment of the present invention. A digital signal processor or the like produces a signal composed of digital samples of a high crest-factor, e.g., DMT/ADSL, communications signal. The communications signal is input to a sigma-delta modulator. Preferably, the sigma-delta modulator is second order or higher.

The sigma-delta modulator produces one or more pairs of digital output signals. In the example of FIG. 5, the sigma-delta modulator produces a single pair of digital output signals, signals A and B. Two signals yield four possible logic combinations. One of these combinations, however, is redundant. That is, the effect of a 11 logic combination is the same as the effect of a 00 logic combination. The circuit of FIG. 5 is therefore described as a three-level ADSL driver, with the logic combinations corresponding to the different levels as shown. The digital output signals are buffered in respective logic buffers and filtered, if necessary, using respective low-pass filters to remove switching noise caused by the sigma-delta modulator. The pair of digital output signals is then applied across a primary winding of a transformer. In an exemplary embodiment, the transformer is a 1:2 transformer having a primary winding of some number of turns and a secondary winding having twice the number of turns. In general, the turns ratio is set so as to achieve a desired output level on the communications line, having a standard 120 ohm impedance, for example.

FIG. 6 shows a five level ADSL driver in which the sigma delta modulator produces two pairs of signals, AB and CD. Although circuits having a still greater number of levels are readily achievable, five levels has been found to be sufficient for purposes of the present ADSL standard. After buffering and filtering, each pair of digital output signals is then applied across a primary winding of a transformer. In an exemplary embodiment, the transformer is a 1:1:2 transformer having a first primary winding of some number of turns, a second primary winding of the same number of turns, and a secondary winding having twice the number of turns. The output signal induced in the secondary winding is the result of superposition of the signals in the first and second primary windings. That is, the first and second pairs of signals are summed in the transformer.

Figure 7:
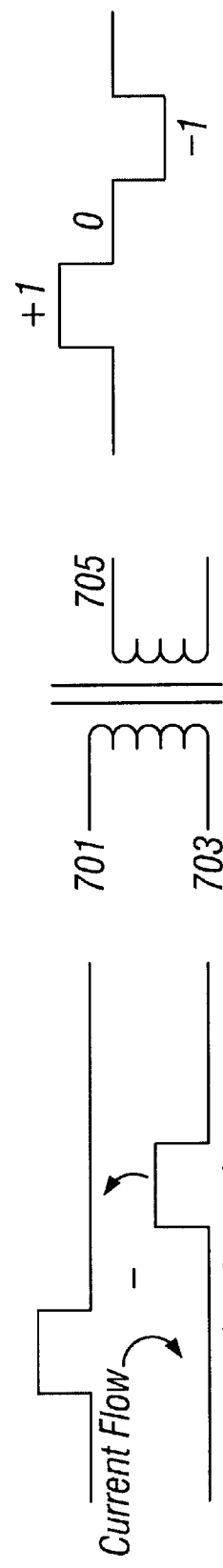
FIG. 7 is a diagram illustrating multiple signal levels produced in response to different logical combinations of signals of a binary signal pair.

Referring to FIG. 7, the effect of applying to a primary winding a pair of digital output signals consisting of offset positive-going pulses is shown. During a first interval, the positive-going pulse at terminal 701 of the primary produces a positive-going pulse at terminal 705 of the secondary. During a second intervening time interval between the two pulses, the terminals 701 and 703 of the primary are at the same voltage level with the result that no current flows through the primary and no voltage is produced in the secondary. During a third time interval, the positive-going pulse at terminal 703 of the primary produces a negative-going pulse at terminal 705 of the secondary. The three resulting voltage levels produced at terminal 705 of the secondary are voltages corresponding to weights of +1, 0 and −1, respectively.

When multiple primary windings are coupled to a single secondary winding, a signal summation occurs. A plus 1 and a plus 1 sum to a plus 2. Likewise, a minus 1 and a minus 1 sum to a minus 2. Possible outputs on the secondary side therefore include −2, −1, 0, +1 and +2. The task of the sigma delta modulator is to apply a sequence of these possible outputs to be applied to the secondary in such a way as to reproduce the digital input signal.

Figure 8:
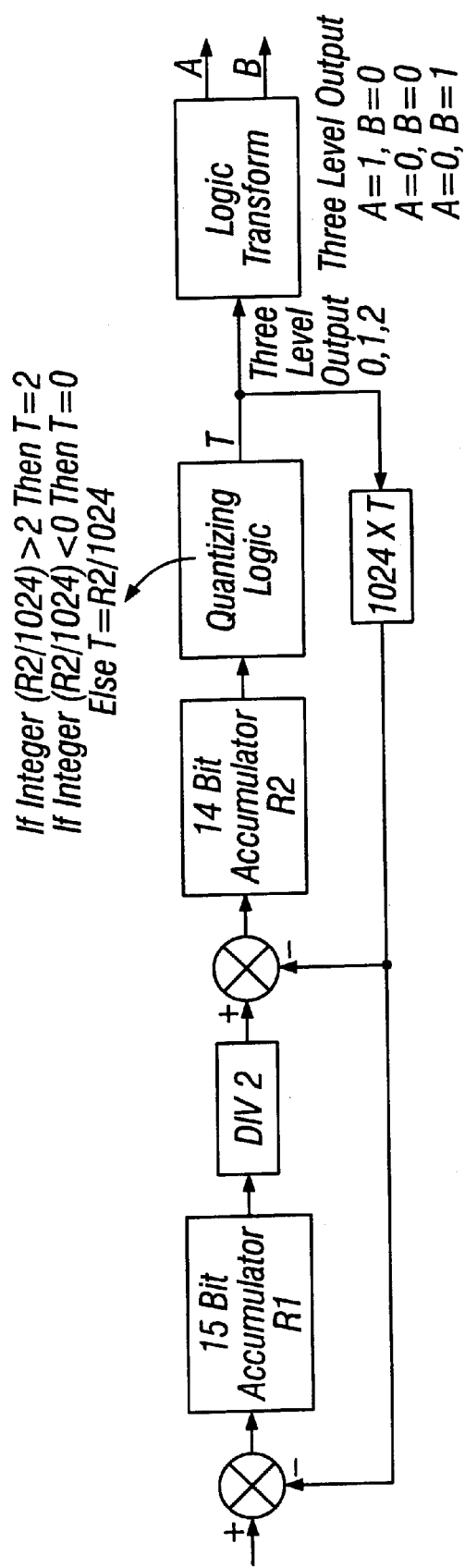
FIG. 8 is a block diagram of one embodiment of a sigma-delta modulator that can be used with the present invention.

An example of a sigma delta modulator for performing the foregoing function is shown in FIG. 8 for the three-level case. The sigma delta modulator is second order, although higher orders can be used. Within the feedforward path, there are a first summer, a first accumulator R1 (e.g., 15-bit), a divide-by-two block, a second summer, a second accumulator R2 (e.g., 14-bit), and quantizing logic. The quantizing logic divides the contents of the accumulator R2 by 1024. The result may range from −1 to 3. If the result is greater than two, then the quantizing logic outputs the value 2. If the result is negative, then the quantizing logic outputs a zero value. Otherwise, the quantizing logic outputs the contents of the accumulator R2. The resulting output signal T of the quantizing logic is a three level output signal having the possible levels 0, 1 and 2.

In the feedback path, the signal T is multiplied by 1024 and the result applied to the negative input of the first and second summers.

The signal T is applied to a logic transform block. The logic transform block is responsive to the three-level signal to produce a corresponding signal pair AB to be applied to the transformer primary.

Figure 9:
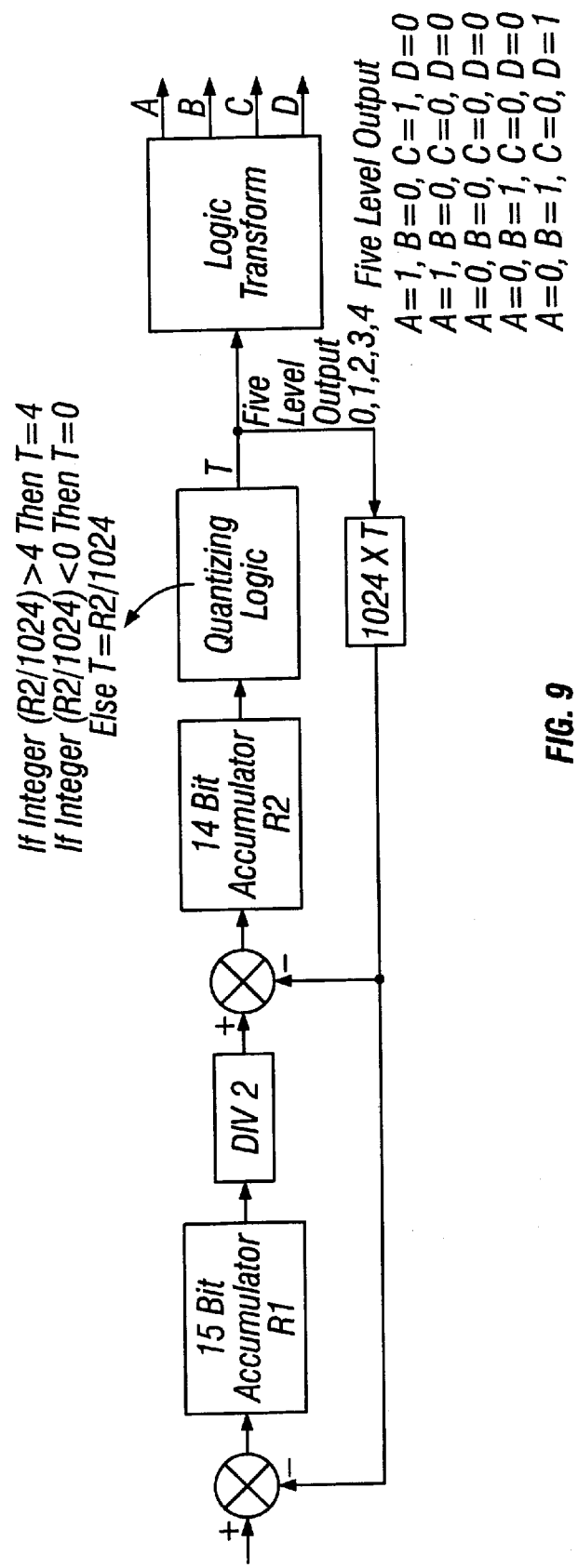
FIG. 9 is a block diagram of another embodiment of a sigma-delta modulator that can be used with the present invention.

FIG. 9 shows the corresponding circuit for the five-level case. In the five-level case, the quantizing logic produces an output signal T having five possible levels, 0, 1, 2, 3, and 4. In particular, the quantizing logic divides the contents of the accumulator R2 by 1024. The result may range from −1 to 6. If the result is greater than four, then the quantizing logic outputs the value 2. If the result is negative, then the quantizing logic outputs a zero value. Otherwise, the quantizing logic outputs the contents of the accumulator R2. The resulting output signal T of the quantizing logic is a five-level output signal having the possible levels 0, 1, 2, 3 and 4.

The signal T is applied to a logic transform block. The logic transform block is responsive to the five-level signal to produce two corresponding signal pairs AB and CD to be applied to respective transformer primary windings.

The circuits of FIG. 5 and FIG. 6, or circuits of the type shown in FIG. 5 and FIG. 6, have several desirable properties. Unlike prior art circuits, circuits of this type require only a single power supply. A supply voltage in the range of 5–10 V is sufficient, especially given the availability of voltage step-up through the transformer. The transformer provides high-voltage DC isolation, a requirement in any case. Whereas prior-art circuits use a transformer expressly for that purpose, in the circuits of FIG. 5 and FIG. 6, the transformer is needed for the summation function but additionally provides the needed isolation. Another important advantage of the circuits of FIG. 5 and FIG. 6 is that the circuit is inherently balanced. That is, a −1 is produced by a positive-going pulse just as is a +1. The switches used to produce the respective pulses may therefore be very closely matched. This inherent balance avoids the asymmetry problem experienced in Class D amplifier circuits, for example.

Figure 1:
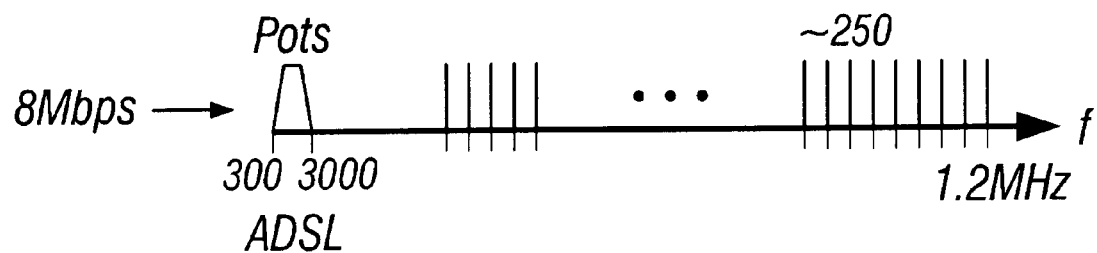
FIG. 1 is a diagram showing the spectrum occupied by an ADSL signal.
Figure 2:
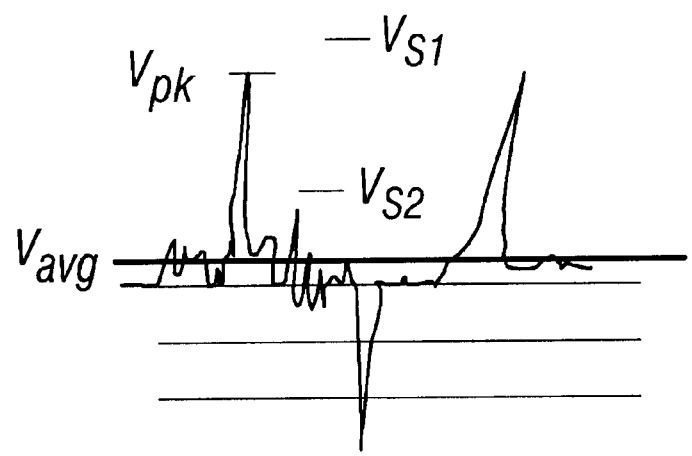
FIG. 2 is an exemplary waveform diagram of an ADSL signal.
Figure 3:
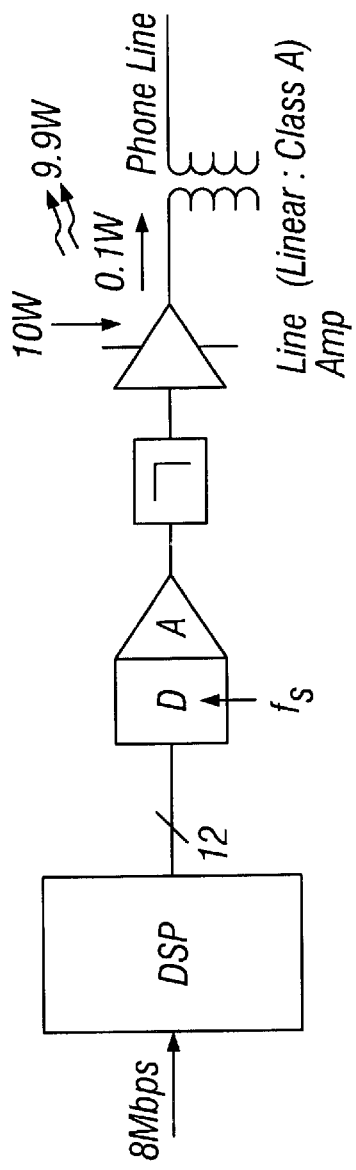
FIG. 3 is a circuit diagram of a prior art ADSL driver.
Figure 4:
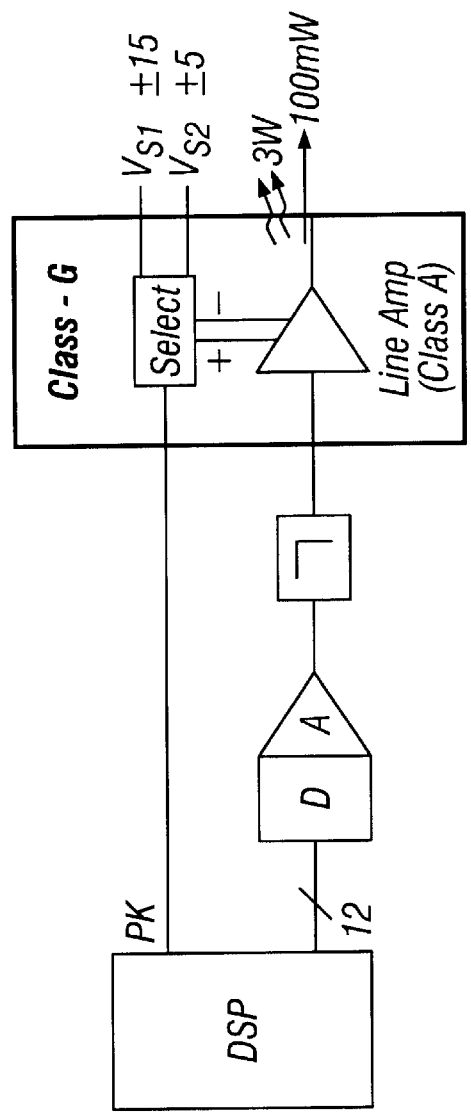
FIG. 4 is a circuit diagram of an improved prior art ADSL driver.

Most notably, since the sigma-delta modulator uses low-loss switches, it dissipates approximately a factor of six less power than the prior art circuit of FIG. 4, 0.5 W as compared to 3 W. As a result, a central office can be expected to accomodate six times as many line drivers, enabling demand to be more readily satisfied.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a data communications system in which data is represented by applying modulation to one or more carriers to form an analog communications signal, a line driver circuit having a digital input signal and an analog output signal coupled to a communications line, comprising:
    a sigma-delta modulator responsive to the digital input signal for producing multiple pairs of digital signals representing the analog communications signal;
    a transformer having at least one primary winding and a secondary winding, the digital signals being applied to the primary winding, the secondary winding being coupled to the communications line; and
    circuitry, including said at least one primary winding, responsive to the multiple pairs of digital signals for driving the secondary winding and the communications line, producing on the communications line the analog communications signal.

2. The apparatus of claim 1, wherein the sigma-delta modulator produces a multi-level signal having at least three levels.

3. The apparatus of claim 1, further comprising logic buffers responsive to the multi-level signal for producing the multiple pairs of digital signals.

4. A method of driving a complex analog communications signal on a subscriber line, the communications signal representing data by applying modulation to one or more carriers to form the communications signal, the method comprising:
    receiving a digitized signal representing the communications signal;
    performing sigma delta modulation of the digitized signal to produce a multi-level signal having at least three levels; and
    coupling the multi-level signal to the subscriber line through a transformer to produce the on the subscriber line the communications signal;
    wherein the sigma-delta modulator produces multiple pairs of digital signals representing the communications signal, each pair of digital signals being applied to a primary winding.

5. The apparatus of claim 4, wherein the sigma-delta modulator produces a multi-level signal having at least three levels.

6. The apparatus of claim 5, further comprising using logic buffers to transform the multi-level signal, producing the multiple pairs of digital signals.

7. Apparatus comprising:
    a digital signal representing an analog communications waveform, the communications waveform representing data by applying modulation to one or more carriers to form the analog communications waveform; and
    means responsive to the digital signal for producing multiple pairs of signals representing the analog communications waveform;
    further comprising a transformer having a secondary winding and at least one primary winding, each one of the multiple pairs of signals being coupled to a primary winding, for producing on a subscriber line the analog communications waveform.

8. The apparatus of claim 7, wherein the secondary winding drives the subscriber line.

9. Method comprising:
    receiving a digital signal representing an analog communications waveform, the communications waveform representing data by applying modulation to one or more carriers to form the analog communications waveform; and
    responsive to the digital signal, producing multiple pairs of signals representing the analog communications waveform;
    further comprising coupling each of the multiple pairs of signals to a primary winding of a transformer having a secondary winding and at least one primary winding to produce on a subscriber line the analog communications waveform.

10. The method of claim 9, further comprising driving the subscriber line using the secondary winding.

* * * * *